United States Patent Office 3,522,051
Patented July 28, 1970

3,522,051
PHOTOGRAPHIC SILVER HALIDE EMULSION MATERIALS CONTAINING 4 - CHLORO - 2-PYRAZOLIN-5-ONE COLOR COUPLERS
Marcel Jacob Monbaliu, Mortsel, Raphael Karel Van Poucke, Mechelen, and Arthur Henri DeCat, Mortsel, Belgium, assignors to Gevaert-Agfa N.V., Mortsel, Belgium, a Belgian company
No Drawing. Filed May 31, 1967, Ser. No. 642,356
Claims priority, application Great Britain, May 31, 1966, 24,188/66
Int. Cl. G03c 1/40
U.S. Cl. 96—100                           2 Claims

ABSTRACT OF THE DISCLOSURE

The present invention relates to a process for the preparation of 4-chloro-2-pyrazolin-5-ones, compounds prepared according to that process and photographic materials containing them.

The direct chlorination of the active methylene group of 1-aryl-3-alkyl-2-pyrazolin-5-ones, more particularly 1-phenyl-3-methyl-2-pyrazolin-5-one and 1-(2,4,6-trichlorophenyl)-3-n-pentadecyl-2-pyrazolin-5-one, has been described by G. Westoo, Acta Chem. Scand. 6, 1499–1515 (1952) and by A. Loria, W. A. Reckhow and I. F. Salminen, U.S. patent specification 3,006,759 respectively.

By chlorination of 1-phenyl-3-methyl-2-pyrazolin-5-one with chlorine Westoo obtained a mixture of 1-phenyl-3-methyl-4-chloro-2-pyrazolin-5-one and the corresponding dichloro-derivative.

According to said U.S. patent specification 3,006,759 1 - (2,4,6-trichlorophenyl) - 3 - n-pentadecyl-4-chloro-2-pyrazolin-5-one was prepared by chlorinating 1-(2,4,6-trichlorophenyl) - 3-n-pentadecyl-2-pyrazolin-5-one with sulphuryl chloride in a mixture of acetic acid and sodium acetate; however, with that preparation method, we have found by thin layer chromatography that the crude product contained 40% of the corresponding 4,4-dichloro-compound.

In the class of 3-amino-2-pyrazolin-5-ones and derivatives no examples of 4-chloro-compounds are described in the literature. Applying the preparation procedures described above on said 3-amino-2-pyrazolin-5-ones we obtained a mixture of three products: the starting product, the monochloro- and the dichloro-compound. Only by a troublesome purification the monochloro-compound could be obtained in a very little yield.

An economic synthesis of pure 4-chloro-2-pyrazolin-5-one compounds is particularly valuable in view of their use in silver halide colour photography. These compounds are known as 2-equivalent couplers, which need only two molecules of exposed siliver halide to form a molecule of magenta dyestuff with one molecule of a p-phenylenediamino developing compound.

According to the present invention the selective preparation of 4-chloro-2-pyrazolin-5-one compounds is carried out by chlorinating 2-pyrazolin-5-one compounds by means of sulphuryl chloride or chlorine in the presence a Friedel-Crafts metal halide, such as anhydrous aluminium chloride.

Suitable reaction media for that chlorination are the solvents that are usually applied in Friedel-Crafts reactions, e.g. nitrobenzene, tetrahydrothiophene-1,1-dioxide, nitromethane, and a series of chlorinated lower aliphatic hydrocarbons, such as dichloromethane, and carbon tetrachloride.

The yield, rate and selectively of the monochlorination are determined by the nature of the solvent, the reaction temperature and especially by the amount of anhydrous aluminium chloride used.

In general the 2-pyrazolin-5-ones may be monochlorinated at room temperature in dichloromethane and with an equimolecular amount of anhydrous aluminium chloride. In the presence of aluminium chloride the chlorination reaction is retarded and may be very slow at room temperature. It is possible to carry out the monochlorination in a relatively short time at increased temperature, more particularly at 40–80° C. In order to accelerate the halogenation reaction and to maintain the selectivity of the chlorination the reaction is usually carried out in boiling dichloromethane in the presence of an amount of anhydrous aluminium chloride exceeding one equivalent of the 2-pyrazolin-5-one compound. If groups are present that are complexated by aluminium chloride, an additional equimolecular amount of the metal halide is used.

When the 2-pyrazolin-5-one is slightly soluble in a mixture of dichloromethane and aluminium chloride, it is possible to render the reaction mixture homogeneous by the addition of nitrobenzene.

The general progress of our method resides in the easy and selective preparation of 4-chloro-2-pyrazolin-5-ones in a high yield and with a high degree of purity. The purity of the products is established by an elementary analysis combined with thin layer chromatography. It is to be mentioned that the elementary analysis gives no direct indication of the purity because an equimolar amount of active methylene compound and dichloro-compound is observed as a monochloro-compound.

In the following table a comparison is made between the results obtained according to our preparation method and those obtained according to the method described in the U.S. patent specification 3,006,759.

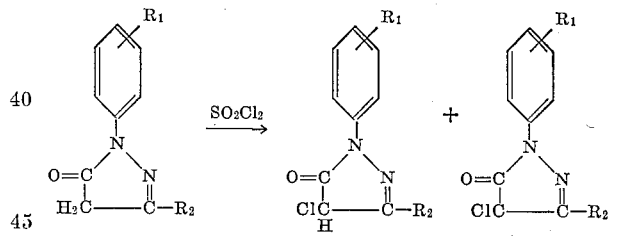

| | | Percent dichloro-compound in the crude product [1] | |
|---|---|---|---|
| $R_1$ | $R_2$ | $SO_2Cl_2$— $NaOOCCH_3$— $CH_3COOH$ | $SO_2Cl_2$—$AlCl_3$— $CH_2Cl_2$ |
| 2,4,6-$Cl_3$ | n-$C_{15}H_{31}$ | 40 | |
| H | $CH_3$ | 35 | 1 |
| H | NHCONH-n-$C_{18}H_{37}$ | 30 | |
| H | $NH_2$ | 30 | 1 |

[1] Semi-quantitative determination by thin layer chromatography.

As illustrated by the experimental part a wide range of 2-pyrazolin-5-ones can be selectively monochlorinated. The method is more particularly applicable to the preparation of 4-chloro-2-pyrazolin-5-one compounds according to the following general formula:

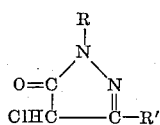

wherein:

R represents an aliphatic radical, e.g. an alkyl radical containing 1 to 20 carbon atoms, an aromatic radical, e.g. a phenyl radical, or a heterocyclic radical including these radicals in substituted form e.g. substituted by halogen atoms, and R' represents alkyl including substituted alkyl, amino including substituted amino, e.g. an aryl-substituted amino group, an acyl substituted amino group, a N-alkyl carbamoyl substituted amino group or a N-aryl carbamoyl substituted amino group.

As new valuable colour couplers for magenta according to the above general formula are particularly mentioned those wherein R' is an aryl-substituted amino group or an acyl-substituted amino group.

Particularly valuable are the 3-acylamino-4-chloro-2-pyrazoline-5-ones, which also can be prepared by N-acylation of the corresponding 3-amino-4-chloro-2-pyrazolin-5-one compound with acid chlorides or anhydrides.

The following illustrates the preparation method according to the present invention without, however, limiting it thereto. The abbreviation "TLC" is used for "thin layer chromatography."

PREPARATION 1

1-phenyl-3-methyl-4-chloro-2-pyrazolin-5-one

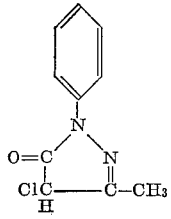

To a solution of 8.7 g. (0.05 mole) of 1-phenyl-3-methyl-2-pyrazolin-5-one and 13.34 g. (0.1 mole) of anhydrous aluminum chloride in 50 cc. of dried dichloromethane, 4.05 cc. (0.05 mole) of sulphuryl chloride are dropwise added at 20° C. A fairly vigorous evolution of hydrogen chloride and sulphur dioxide sets in. The solution is refluxed for 2 h. 30 min. The solvent is evaporated and the residual oil is treated with 50 cc. of cooled 5 N hydrochloric acid. The precipitate formed is filtered by suction and washed with 50 cc. of water/methanol mixture (1:1). Yield: 10.2 g. (97.5%). Analysis by TLC indicates a content of 1% of dichloro compound. Recrystallization from methanol yields 6.6 g. (63%) of a crystalline product. Melting point: 180° C. (with decomposition). Analysis of Cl: Calculated (percent): 17.00. Found (percent): 16.99–16.89.

PREPARATION 2

1-(2',4',6'-trichlorophenyl)-3-n-pentadecyl-4-chloro-2-pyrazolin-5-one

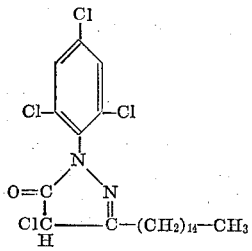

In a 500 cc. flask are placed successively 47.35 g. (0.1 mole) of 1(2',4',6'-trichlorophenyl)-3-n-pentadecyl - 2-pyrazolin-5-one, 20 g. (0.15 mole) of pulverized anhydrous aluminum chloride, and 325 cc. of dry dichloromethane. The temperature rises to 30° C. and the reaction mixture is stirred for 30 min. at room temperature. Then 8.1 cc. (0.1 mole) of sulphuryl chloride are added. The solution is stirred for 30 min. at room temperature and then is refluxed on a water bath for 24 hr.

The solvent is evaporated under reduced pressure and the residual brown oil is dissolved in 400 cc. of boiling methanol. Thereupon 13 cc. of 1 N hydrochloric acid are added and the mixture is allowed to stay overnight. The light brown crystalline precipitate formed is filtered by suction and dried at 40° C. Yield: 44.8 g. (88.2%). Melting point: 70–71° C. This product is recrystallized from 130 cc. of boiling hexane and the residue is filtered off. In the filtrate 33.2 g. (65.3%) of the title compound crystallize. Melting point: 87–88° C. The product contains still 0.5% of starting product: TLC-analysis; Analysis of Cl: Calculated (percent): 27.95. Found (percent): 27.59–28.00.

PREPARATION 3

1-phenyl-3-n-pentadecanoylamino-4-chloro-2-pyrazolin-5-one

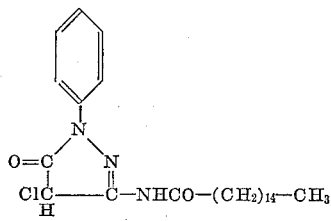

(a) In a 500 cc. flask 13.35 g. (0.1 mole) of pulverized anhydrous aluminum chloride are dissolved in a mixture of 10 cc. of nitrobenzene and 200 cc. of dry dichloromethane. To the clear yellow solution obtained are added successively 8.96 cc. (0.11 mole) of sulphuryl chloride and 41.3 g. (0.1 mole) of 1-phenyl-3-n-pentadecanoyl-amino-2-pyrazolin-5-one. The solution is stirred for 1 hr. at room temperature and refluxed for further 5 hr.; hydrogen chloride and sulphur dioxide are evolved. The solvent is evaporated and the residue left dissolved in 200 cc. of methanol. To this solution are added 50 cc. of water, and the mixture is allowed to stay overnight. The precipitate formed is filtered by suction and washed successively with water, methanol and hexane, and dried at 40–50° C. Yield: 40.8 g. (91%). The obtained product is recrystallized from methanol. Yield: 27 g. (60%). Melting point: 109° C. Analysis of Cl: Calculated (percent): 7.94%. Found (percent): 7.90.

No impurities could be detected.

(b) To a mixture of 4.2 g. (0.02 mole) of 1-phenyl-3-amino-4-chloro-5-pyrazolone, prepared as described in preparation 7, and 5.34 g. (0.04 mole) of anhydrous aluminium chloride in 20 cc. of nitrobenzene, 5.49 g. (0.02 mole) of palmitoyl chloride are added. Hydrogen chloride is evolved immediately. After having been heated for 1 hr. at 50° C. the mixture is poured into 200 cc. of 1 N hydrochloric acid. The solidified oil obtained is filtered by suction and recrystallized from 50 cc. of methanol.

Yield: 5.3 g. (63%). Melting point: 109° C. Analysis of Cl: Calculated (percent): 7.94. Found (percent): 7.87.

PREPARATION 4

1-methyl-3-n-pentadecanoylamino-4-chloro-2-pyrazolin-5-one

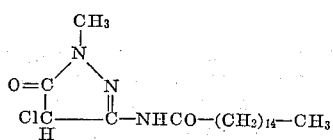

To a cooled solution (10° C.) of 3.51 g. (0.01 mole) of 1-methyl-3-n-pentadecanoylamino-2-pyrazolin-5 - one and 1.34 g. (0.01 mole) of anhydrous aluminium chloride in 15 cc. of dichloromethane is added 0.81 cc. (0.01 mole) of sulphuryl chloride. The solution is stirred for 18 hr. at room temperature. Hydrogen chloride and sulphur dioxide are evolved. The dichloromethane solvent is evaporated and the residue is treated with 5 N hydrochloric acid and ice. The precipitate formed is filtered by suction and dried. Yield: 3.15 g. (81.5%). Melting point: 116–118° C. (with decomposition).

*Analysis.*—Calculated (percent): 62.09; H, 9.32; Cl, 9.44. Found (percent): C, 62.29; H, 9.41; Cl, 9.31. By TLC no by-products could be detected.

PREPARATION 5

1-phenyl-3-n-octadecylureido-4-chloro-2-pyrazolin-5-one

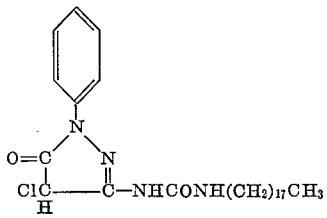

(a) 94 g. (0.2 mole) of 1-phenyl-3-n-octadecylureido-2-pyrazolin-5-one, prepared as described in United Kingdom patent specification 1,007,847 are dissolved in a solution of 26.7 g. (0.2 mole) of aluminium chloride in 300 cc. of dichloromethane and 100 cc. of nitrobenzene. To the mixture 16.2 cc. (0.2 mole) of sulphuryl chloride are added at once. The reaction mixture is refluxed for 1 hr. and poured into 2 litres of 1 N hydrochloric acid. The precipitate formed is recrystallized from methanol. Yield: 82 g. (81%) of white product. Melting point: 113° C.

Analysis of Cl: Calculated (percent): 7.04. Found (percent): 7.04; 7.03.

The residual content of the starting product was 0.5% (TLC).

(b) Through a mixture of 47 g. (0.1 mole) of 1-phenyl-3-n-octadecylureido-2-pyrazolin-5-one and 13.35 g. (0.1 mole) of anhydrous aluminium chloride in 100 cc. of nitrobenzene 7.8 g. of chlorine (0.11 mole) are bubbled at 40° C. over a period of 30 min. The chlorination is slightly exothermic. Then, the reaction mixture is stirred for another hour at room temperature and poured into 5 N hydrochloric acid. The precipitate formed is filtered by suction and recrystallized from methanol. Yield: 32.7 g. (65%). Melting point: 112° C.

PREPARATION 6

1-(p'-n-hexadecylsulphonylphenyl)-3-phenylamino-4-chloro-2-pyrazolin-5-one

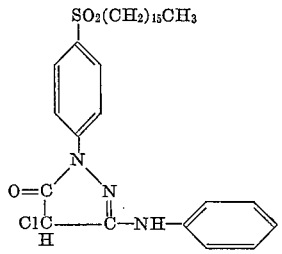

To a suspension of 5.39 g. (0.01 mole) of 1-(p'-n-hexadecylsulphonylphenyl)-3-phenylamino-2-pyrazolin-5-one and 1.33 g. (0.01 mole) of anhydrous aluminium chloride in 12 cc. of dichloromethane and 5 cc. of nitrobenzene 1.35 g. (0.01 mole) of sulphuryl chloride is added. At boiling temperature a solution is obtained and after 2 hr. of refluxing 50 cc. of methanol are added. The title product crystallizes. Yield: 4.65 g. (81%). Melting point: 137° C. (with decomposition). Analysis of Cl: Calculated (percent): 6.19. Found (percent): 6.26–6.28.

PREPARATION 7

1-phenyl-3-amino-4-chloro-2-pyrazolin-5-one

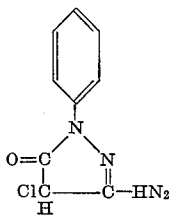

In a 5 litre flask, equipped with a stirrer and a condensor are brought 147 g. (1.10 mole) of pulverized anhydrous aluminium chloride and 175 g. (1 mole) of 1-phenyl-3-amino-2-pyrazolin-5-one. Under stirring 2000 cc. of dried dichloromethane are dropwise added. After an exothermic complexation reaction, the mixture is cooled to room temperature and 81 cc. (135 g.=1 mole) of sulphuryl chloride are added. Hydrogen chloride and sulphur dioxide are evolved. The mixture is stirred for 24 hr. at room temperature and then refluxed for 15 minutes. The solvent is evaporated and the residual brown oil is dissolved in 750 cc. of boiling methanol.

Under stirring the solution is added dropwise to 2000 cc. of 1 N hydrochloric acid. The precipitate formed is filtered with suction, washed successively with water and methanol-water mixture (1:1), and dried at 40° C. Yield: 176.5 g. (84%). Melting point: 163–4° C. (with decomposition). Analysis by TLC indicates a content of dichloroderivative of 1%.

The product is purified by boiling in 1400 cc. of dichloromethane and filtered whilst hot. Yield: 147 g. (70%). Melting point: 164° C. Analysis of Cl: Calculated (percent): 16.96. Found (percent): 17.22.

PREPARATION 8

1-(2',4',6'-trichlorophenyl)-3-amino-4-chloro-2-pyrazolin-5-one

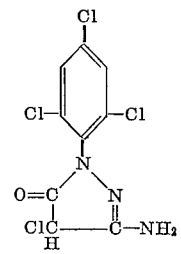

In the same way as in the foregoing preparation 300 cc. of anhydrous dichloromethane are added to 40 g. (0.3 mole) of pulverized anhydrous aluminium chloride and 55.7 g. (0.2 mole) of 1-(2',4',6'-trichlorophenyl)-3-amino-2-pyrazolin-5-one. The complexation reaction is exothermic and occurs with an evolution of hydrogen chloride. The suspension obtained is cooled at room temperature and treated with 16.2 cc. (0.2 mole) of sulphuryl chloride. This mixture is refluxed for 24 hr. with stirring. Then the solvent is evaporated and the residue is cautiously treated with 500 cc. of 5 N hydrochloric acid. The liquid is decanted and the residue left dissolved in 100 cc. of ethanol and 200 cc. of 2 N sodium hydroxide. The solution is filtered and neutralized with acetic acid. The precipitate formed is filtered with suction and dried.

Yield: 49 g. (78%). Melting point: 186–188° C. The product is purified by boiling with 200 cc. of dichloromethane. Yield: 44 g. (70%). Melting point: 192–194° C. (with decomposition). TLC indicates no by-products.

PREPARATION 9

1-[o-(n-octadecyl)-thiophenyl]-3-amino-4-chloro-2-pyrazolin-5-one

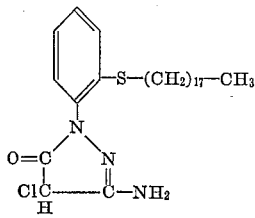

To a solution of 9.2 g. (0.02 mole) of 1-[o-(n-octadecyl)-thiophenyl]-3-amino-2-pyrazolin-5-one and 2.67 g. (0.02 mole) of pulverized anhydrous aluminium chloride in 20 cc. of dry dichloromethane, 1.62 cc. (0.02 mole) of sulphuryl chloride is added. After standing for 18 hr. at room temperature the solvent is evaporated and the residue left treated with ice-water. The white precipitate obtained is filtered by suction and dried at 40–50° C. Yield: 8.2 g. (83%). Melting point: 45–50° C. This white precipitate is recrystallized from 30 cc. of methyl acetate. Yields: 7.15 g. (72%). Melting point: 80–85° C.

*Analysis.*—Calculated (Percent): S, 6.49; Cl, 7.20. Found (percent): S, 6.45; Cl, 7.32.

By TLC 1% of the starting product is detected.

PREPARATION 10

1-(2,2,2-trifluoroethyl)-3-amino-4-chloro-2-pyrazolin-5-one

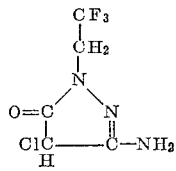

To a suspension of 3.62 g. (0.02 mole) of 1-(2,2,2-trifluoroethyl)-3-amino-2-pyrazolin-5-one and 2.67 g. (0.02 mole) of pulverized anhydrous aluminium chloride in 20 cc. of dichloromethane, 1.62 cc. (0.02 mole) of sulphuryl chloride is added. A homogeneous solution is obtained, which separates in two layers. After 48 hr. the upper layer is decanted and to the brown residue are added cautiously and portionwise 5 cc. of ice-water. The grainy precipitate formed is filtered by suction and dried. Yield: 3.00 g. (70%). This precipitate is recrystallized from 5 cc. of water at 80° C. Yield: 2.6 g. (60%). Melting point: 133° C. (with decomposition).

*Analysis.*—Calculated (percent): C, 27.84; H, 2.32; Cl, 16.49. Found (percent): C, 28.11; H, 2.37; Cl, 16.56.

PREPARATION 11

1-p-(n-hexadecylsulfonyl)phenyl-3-amino-4-chloro-2-pyrazolin-5-one

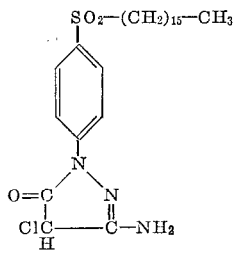

To a cooled solution of 53.40 g. (0.4 mole) of aluminium chloride, 40 cc. of nitrobenzene, 800 cc. of dried dichloromethane and 185 g. (0.4 mole) of 1-p-(n-hexadecylsulphonyl)phenyl-3-amino-2-pyrazolin-5-one are added 32.4 cc. (0.4 mole) of sulphuryl chloride. The solution is stirred for 24 hr. at room temperature. The solvent is evaporated and the residual oil is cooled and treated with 1000 cc. methanol and 100 cc. of 1 N hydrochloric acid. The precipitate formed is filtered by suction and dried. Yield: 176 g. (85.5%). Analysis by TLC: 2% of dichloro-compound. The product is recrystallized from 1500 cc. of ethanol. Yield: 140 g. (70%). Melting point: 160–162° C. Analysis of Cl:Calculated (percent): 7.13. Found (percent): 7.01.

New and preferably used colour couplers, which can be prepared according to the present invention can be represented by the following general formula:

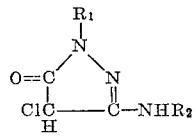

wherein:

$R_1$ represents alkyl including substituted alkyl, aryl, including substituted aryl, e.g. phenyl, alkoxy-substituted phenyl, phenoxy-substituted phenyl, alkylsulphonyl-substituted phenyl, phenylsulphonyl-substituted phenyl, halogen-substituted phenyl, alkyl-substituted phenyl, sulphamyl-substituted phenyl and N-alkyl-substituted sulfamylphenyl, and $R_2$ represents aryl, including substituted aryl, e.g. phenyl, sulpho-substituted phenyl, fluorosulphonyl-substituted phenyl, alkoxy-substituted phenyl, alkyl-substituted phenyl, halogen-substituted phenyl, alkyl-sulphonyl-substituted phenyl, phenylsulphonyl-substituted phenyl, sulphamyl-substituted phenyl, N-alkyl-substituted sulphamylphenyl, or an acyl group, e.g. an alkyl carbonyl or arylcarbonyl group, a N-alkylcarbamoyl group, or a N-arylcarbamoyl group, including the latter groups in substituted form.

The most important advantage of the said new colour couplers is their economic use of light-sensitive silver halide, which can be illustrated by the following reaction scheme:

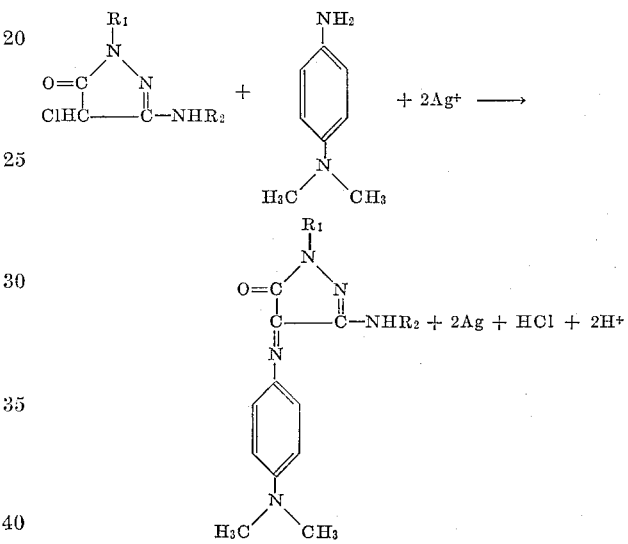

Photographic silver halide emulsion layers wherein a colour image is formed by means of a 2-equivalent coupler according to the present invention, possess in comparison with an emulsion layer containing a corresponding 4-equivalent coupler a higher sensitivity and a harder gradation.

The coupler compounds of the present invention normally have a melting point which is 40 to 60° C. lower than that of the corresponding couplers that are unsubstituted in the 4-position; therefore the 4-chloro-2-pyrazolin-5-ones have a lower tendency to crystallize in the emulsion.

Further the colour couplers of the present invention are more soluble in organic solvents than the corresponding 4-unsubstituted compounds, so that higher concentrations of them can be used and consequently higher dye densities can be obtained.

The couplers may be dissolved in either a low-boiling water-insoluble organic solvent or an appreciably water-soluble organic solvent and can be finely dispersed in a photographic colloid, e.g. gelatin. Particularly useful dispersing techniques which can be applied are described in the published Dutch patent applications 656423; 656424; 6600098; 6600099 and 6600628. A particular colour coupler according to the present invention may be incorporated into a silver halide emulsion according to any other appropriate technique known in the art.

The preferred couplers of our invention are free from wandering from the hydrophilic colloid layer into which they have been incorporated. Therefore they preferably contain a so-called "ballasting group" e.g. in the 1- or 3-position of the pyrazolin nucleus. That group may be an aliphatic radical with a linear chain having from 5 to 20 carbon atoms, e.g. a n-octadecyl, a n-hexadecyl, a n-pentadecyl, or a hexadecene-2-yl radical.

The couplers according to the above general formula may be used in various kinds of photographic emulsions. They may be added to the emulsions before or after any sensitizing dyes are incorporated. Various silver salts may be used as the sensitive salt, such as silver bromide, silver iodide, silver chloride, or mixed silver halides, such as silver chlorobromide or silver bromoiodide. The colour couplers may be incorporated into emulsions of the mixed packet type, e.g. as described in the U.S. patent specification 2,698,794 or into emulsions of the mixed grain type, e.g. as described in the U.S. patent specification 2,592,243. The colour couplers can be used in emulsions wherein latent images are formed predominantly on the surface of the silver halide crystal, or in emulsions wherein latent images are formed predominantly inside the silver halide crystal.

The coupler compounds of the present invention may be dispersed in any water-permeable hydrophilic colloid material, such as gelatin, albumin, casein, zein and the like, and synthetic hydrophilic colloids, such as polyvinyl alcohol, that may be used for making photographic emulsions. The emulsions usually also comprises i.a. spectrally sensitizing agents, hardeners, stabilizing agents, development accelerators e.g. polyoxyalkylene compounds and wetting agents for facilitating the coating and the adherence of the emulsion. The thus prepared silver halide emulsion can be coated as one of the layers of a one-layer or multilayer colour material.

The colour couplers according to the present invention need not necessarily be provided in the silver halide emulsion layer, but they may also be incorporated into a colloid layer adjacent to a silver halide emulsion layer or into a colloid layer in water-permeable relationship therewith.

Photographic emulsions containing these couplers may be coated on transparent supports such as glass, cellulose esters or on a non-transparent reflecting material, such as paper or an opaque cellulose ester.

Photographic emulsions containing these colour couplers can be developed by any of the conventional primary amino developing compositions. Suitable developing agents are aromatic compounds, such as p-phenylene diamine, N,N-dialkyl-p-phenylenediamines, such as N,N-diethyl-p-phenylenediamine and derivatives, such as N,N-dialkyl-N'-sulphomethyl-p-phenylenediamines and N,N-dialkyl-N'-carboxy-methyl-p-phenylenediamines.

The following example further illustrates the present invention.

EXAMPLE

To a portion (a) of 922 cc. of a green-sensitive silver bromo-iodide (4.7 mole percent of iodide) emulsion is added 0.0013 mole of the colour coupler prepared according to preparation 5 in the form of a solution in a mixture of 4.8 cc. of ethanol, 4.8 cc. of water and 2.4 cc. of 1 N aqueous sodium hydroxide.

To a portion (b) of the same amount of identic silver bromoiodide emulsion is added 0.0013 mole of 1-phenyl-3-(3-octadecylureido)-2-pyrazolin-5-one prepared according to the U.K. patent specification 1,007,847 in the form of a solution in a mixture of 5.28 cc. of ethanol, 5.28 cc. of water and 2.64 cc. of 1 N aqueous sodium hydroxide. After the addition of the colour couplers the emulsion portions are acidified with 2.4 cc. of 1 N sulphuric acid and 2.64 cc. of 1 N sulphuric acid respectively. Thereupon the required hardeners, wetting agents, stabilizers and the necessary amounts of water are added in order to obtain 1 kg. samples of emulsion. Each of these samples of emulsion is coated on a cellulose triacetate support in a ratio of 0.0176 mole of silver halide per sq. m. and dried.

Under the same conditions the thus obtained emulsion strips are exposed and developed in a developer as described in the U.K. patent specification 1,044,959.

In the following table are listed the amounts of developed silver per sq. m. (Ag) for a same colour density (D) as well as the quotient colour density/silver per sq. m. (D/Ag). The emulsion strip containing the colour coupler according to the present invention and the other emulsion strip are denominated A and B respectively.

TABLE

| Emulsion | D | Ag | D/Ag |
|---|---|---|---|
| A | 2.19 | 0.209 | 10.5 |
| B | 2.19 | 0.443 | 5.1 |

From that table clearly appears that the colour coupler according to the present invention is a 2-equivalent coupler needing on development only the half of silver halide in comparison with a colour coupler, which is not substituted in the coupling position with a chlorine atom.

What we claim is:

1. A photographic silver halide emulsion material containing at least one silver halide emulsion layer and a colour coupler according to the following general formula:

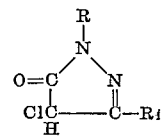

wherein:
R represents an aliphatic, an aromatic or a heterocyclic radical, and
R' represents an amino group.

2. A photographic silver halide emulsion material according to claim 1, comprising in a silver halide emulsion layer of an amount of a colour coupler of the general formula wherein R and/or R' is or contains a ballasting group.

References Cited

UNITED STATES PATENTS 3,006,759   10/1961   Loria et al. _____ 96—55

NORMAN G. TORCHIN, Primary Examiner

A. T. SURO PICO, Assistant Examiner.

U.S. Cl. X.R.
96—56.5; 260—310